United States Patent
Corfield et al.

(10) Patent No.: US 10,922,485 B2
(45) Date of Patent: Feb. 16, 2021

(54) PLATFORM INTERPRETATION OF USER INPUT CONVERTED INTO STANDARDIZED INPUT

(71) Applicant: FinancialForce.Com, Inc., San Francisco, CA (US)

(72) Inventors: Richard Corfield, Harrogate (GB); Stephen Fry, Harrogate (GB)

(73) Assignee: FinancialForce.com, Inc., San Francisco, CA (US)

( * ) Notice: Subject to any disclaimer, the term of this patent is extended or adjusted under 35 U.S.C. 154(b) by 8 days.

(21) Appl. No.: 16/507,561

(22) Filed: Jul. 10, 2019

(65) Prior Publication Data
US 2021/0011972 A1    Jan. 14, 2021

(51) Int. Cl.
*G06F 40/205* (2020.01)
*G06F 7/24* (2006.01)
*G06F 40/166* (2020.01)
*G06F 40/284* (2020.01)

(52) U.S. Cl.
CPC ............ *G06F 40/205* (2020.01); *G06F 7/24* (2013.01); *G06F 40/166* (2020.01); *G06F 40/284* (2020.01)

(58) Field of Classification Search
None
See application file for complete search history.

(56) References Cited

U.S. PATENT DOCUMENTS

| | | | |
|---|---|---|---|
| 2003/0033278 A1* | 2/2003 | Abe | G06F 7/24 |
| 2006/0190452 A1* | 8/2006 | Ellis | G06F 16/284 |
| 2008/0147627 A1* | 6/2008 | Natkovich | G06F 16/2454 |
| 2009/0319499 A1* | 12/2009 | Meijer | G06F 16/24526 |
| 2011/0213766 A1* | 9/2011 | Hong | G06F 16/284 707/718 |
| 2016/0299982 A1* | 10/2016 | Bhave | G06F 16/335 |
| 2020/0089760 A1* | 3/2020 | Ericson | G06F 40/205 |

* cited by examiner

*Primary Examiner* — Howard Cortes
(74) *Attorney, Agent, or Firm* — Kokka & Backus, PC

(57) ABSTRACT

Disclosed herein is a platform for translating various user input into a standardized input used to cause a database to sort data in a specified manner and present the data in a graphic user interface according to user instruction. User input is a text string that includes a first set of characters and a second set of characters split by a dividing symbol. Based on the choice of dividing symbol and the arrangement of the first set of character and second set of characters the system converts the input into a standardized form.

17 Claims, 8 Drawing Sheets

PLATFORM INTERPRETATION OF USER INPUT CONVERTED INTO STANDARDIZED INPUT

TECHNICAL FIELD

The disclosure relates to user input handling in graphic user interfaces, and more particularly to conversion of input into standardized input.

BACKGROUND

Applications for management and manipulation of large amounts of data strive for high levels of ease of use. Data is sorted into groups or buckets based on commands by the user. Ease of use of a graphic user interface is a paramount concern when manipulating large amounts of data.

DETAILED DESCRIPTION

Disclosed herein is a simple method of entering group or bucket range values including shorthand for easy definitions of repetitive definitions. Traditionally, drop-down menus are used to define groups to sort data. Using menus is a tedious form of input and slows down users who generate multiple reports daily or sorted many ways. Instead of using complicated menus, a simple character string may define all groups/buckets to display data in. The string is interpreted by the system into a system extensible input and the system displays the desired result.

The system begins with a set of data. An example of such a set is a set of accounts receivable records. The data merely needs to be sortable by at least one numeric attribute. Examples of the numeric sortable attribute may be amount due, due dates of the amount due, amount overdue, etc.

The user input string has at least three parts. The three parts include a first set of characters, a second set of characters, and a dividing symbol. The first and second sets of characters are positioned on either side of the dividing symbol. The dividing symbol is a conserved character. Examples include the @ symbol, backslash or forward slash, though others could be implemented.

The first set of characters are positioned to the left side of the dividing symbol and establish the scope of the sorting of data. For example, of the total data, how much of that data is to be sorted. The second set of characters are positioned to the right side of the dividing symbol and establish the scale or increment of the data. For example, the size of each of the groups as compared to a numerically sortable attribute.

Once the system receives and converts the input into a standardized system readable input, the data is sorted and displayed on a graphic user interface in the manner delineated by the user input.

Figure 1:
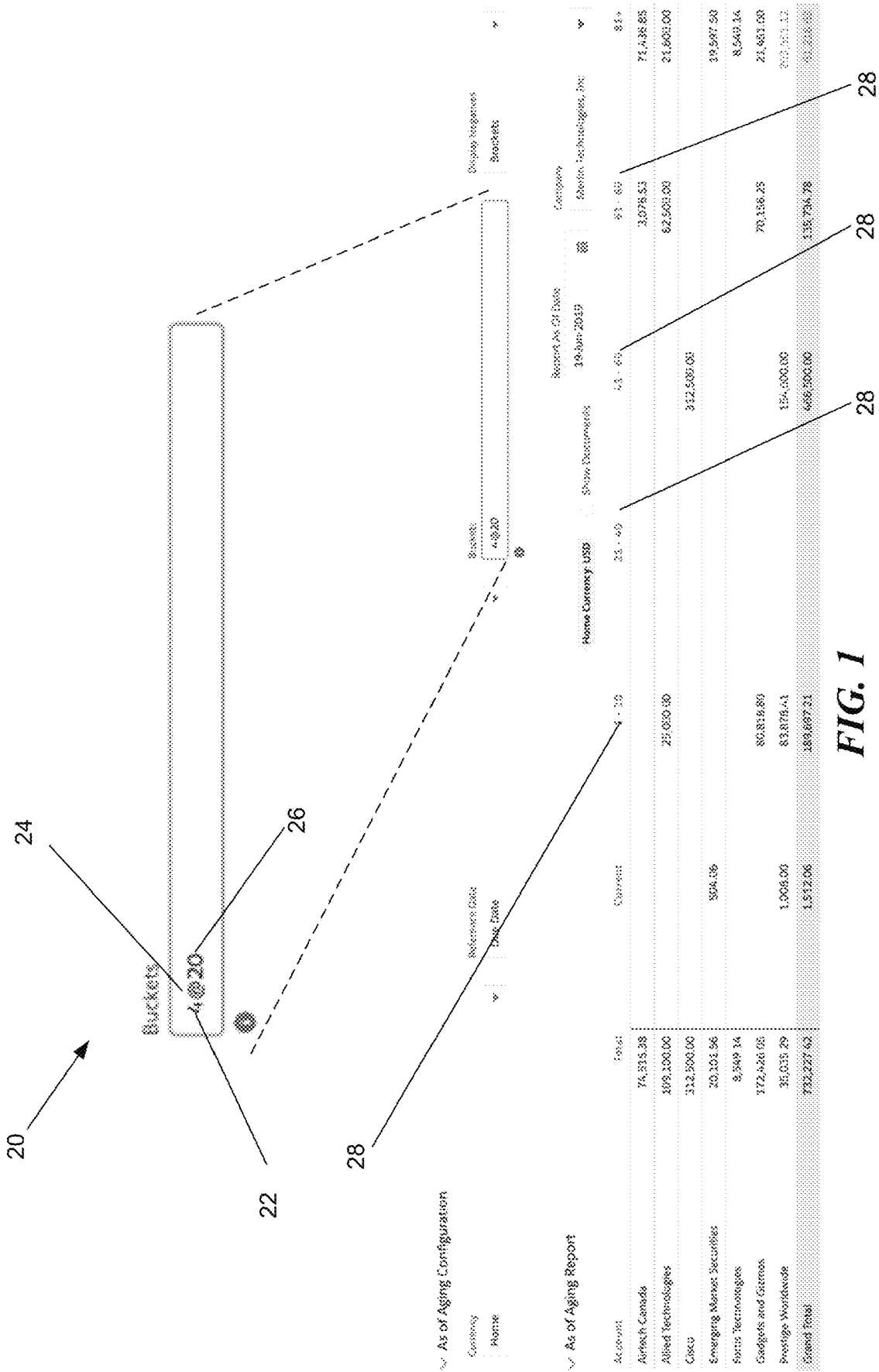
FIG. 1 is a screenshot of a first group notation user input convertible into standardized input that defines groups.

FIG. 1 is a screenshot of a first group notation user input 20 convertible into standardized input that defines groups. The first set of characters 22 is a single number. The single number closest to the dividing symbol 24 refers to the number of groups/buckets to generate. In the figure the single number is "4", so four buckets are generated.

The second set of characters 26 is also a single number. The single number in the second set of characters 26 establishes ranges or intervals that the groups consist of. The ranges are inclusive of a last number in the range. The single number on the right side of the dividing symbol 24 in the figure is "20," thus, each bucket includes a range of 20 of the sortable numeric attribute. Four buckets 28, ranged at twenty, provides for 1-20, 21-40, 41-60, and 61-80.

Figures discussed below describe a number of additional formats of user input that is converted into a standardized input. The format of user input 20 between the first set of characters 22 and second set of characters 26 does not have to match up with those combinations specifically shown in the figures. Any combination of any format of a first set of characters 22 and any format of a second set of characters 26 are system extensible.

Figure 2:
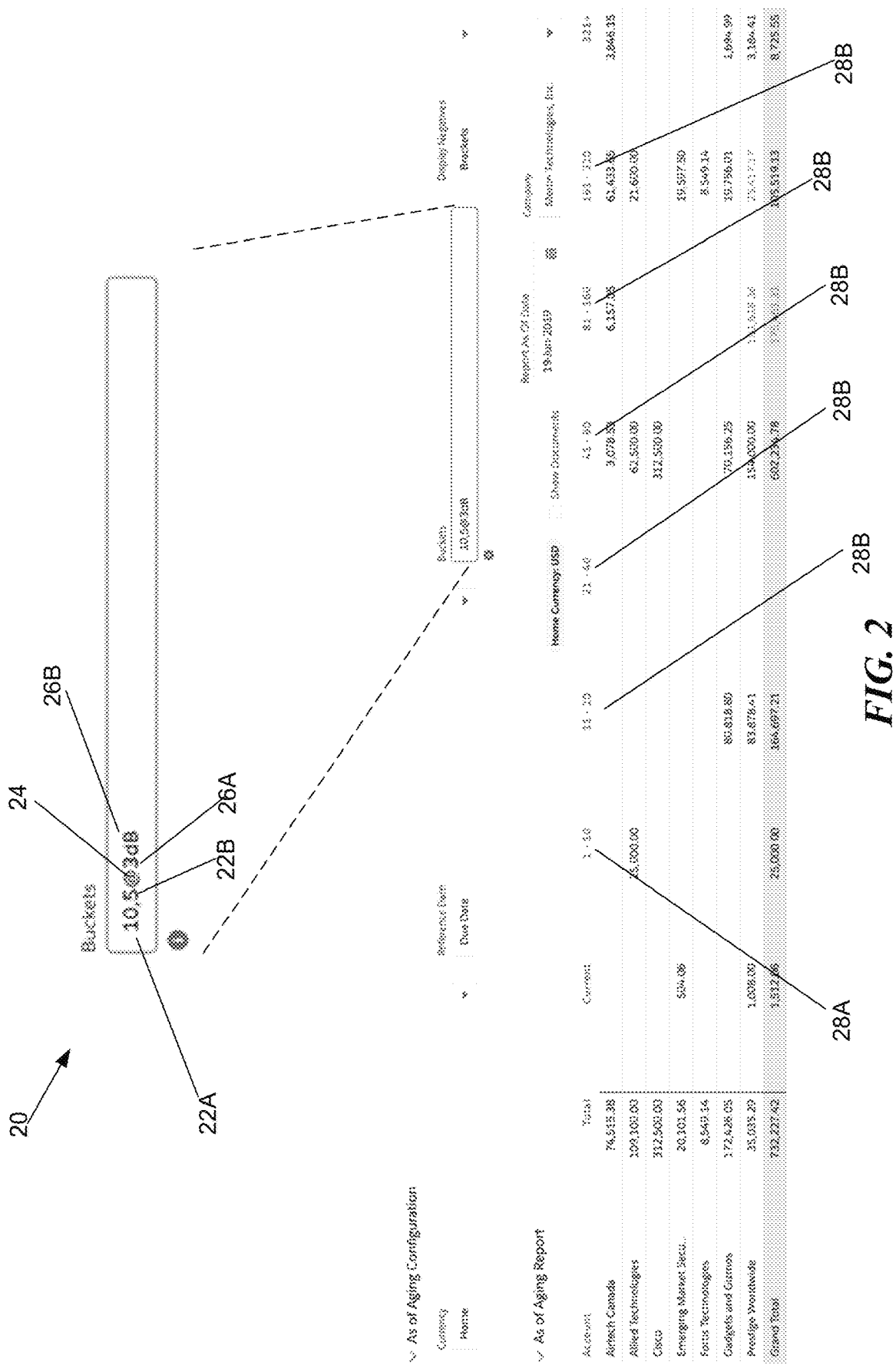
FIG. 2 is a screenshot of a second group notation user input convertible into standardized input that defines groups.

FIG. 2 is a screenshot of a second group notation user input 20 convertible into standardized input that defines groups. Depicted in the figure, the first set of characters 22 includes at least one preliminary number (here, "10") 22A and a last number (here, "5") 22B. In some embodiments, there may be more preliminary numbers 22A, each separated by commas. The last number 22B is the number closest to the dividing symbol 24. Each other number in the first character set 22 is a preliminary number 22A.

The preliminary numbers 22A each establish a top end of a single group 28. Here, the 10 establishes that the top end of the first group 28A is 10. Thus, the first group 28A is 1-10 as compared to the numerically sortable attribute. The last number 22B establishes the number of groups 28 in addition to those defined by the preliminary number(s) 22A and occurring after. The additional groups 28B are determined by the second set of characters (by range/interval). Here, the last number 22B indicates that there will be 5 more groups 28 after the first 1-10 group 28A. The last number 22B further indicates that the intervals begin from 10 (the preliminary number 22A closest to the last number 22B).

Here, the second set of characters 26 includes a number 26A and a set of units 26B. Like in FIG. 1, the second set of characters 26 is used to determine ranges and scale the first set of characters 22. Here, the units 26B are decibels, a logarithmic scaled unit used in signal processing. While the example here is decibels, other mathematical notation or unit scales are implemented as well. The second set of characters 26 establishes ranges of the subset of the data set defined by increments of a product of a first number scaled by the mathematical notation, where the product is compared to the numerically sortable attribute. The ranges are inclusive of a last number in each range.

According to the decibel scale, 3 dB is a value that doubles over the previous. The preliminary number 22A closest to the last number 22B was 10, and there are to be 5 additional groups as determined by the last number 22B. The second set of characters 26 establishes that each group will double the previous. Thus, the remaining 5 ranges are to 20, 40, 80, 160, and 320 (e.g., 11-20, 21-40, 41-80, 81-160, and 161-320). Once established, the data is delineated into groups 28 based on the ranges to each of the number of groups.

Other examples (in addition to a decibel scale) include other logarithmic scales (powers of 2 or powers of 10). Exponential scales (where each range grows at an exponential rate) or multiplicative scales (where each range is scaled up or down by a given integer) are also included as available mathematical notations.

Figure 3:
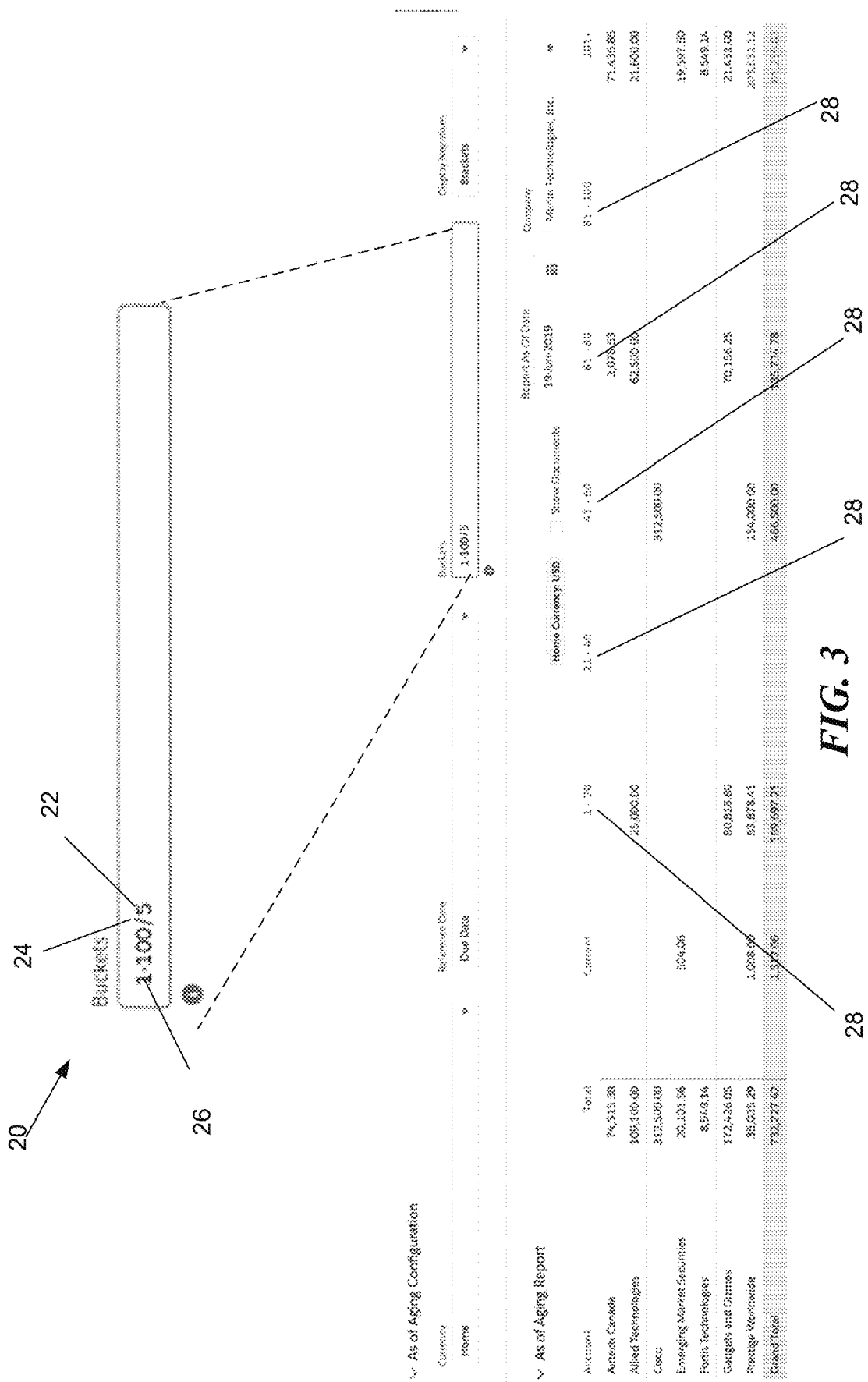
FIG. 3 is a screenshot of a third group notation user input convertible into standardized input that defines groups.

FIG. 3 is a screenshot of a third group notation user input 20 convertible into standardized input that defines groups. Depicted in the figure, the first set of characters 22 and the second set of characters 26 have swapped sides (right-left of the dividing symbol). In some embodiments, the choice of dividing symbol 24 determines the placement of the first and second sets of characters. In the figure, the right side indicates the number of groups (e.g., as the first set of characters 22 did in FIG. 1). The left side, the second set of characters 26, indicates the range that is divided into groups 28. Here, the second set of characters 26 is a range, "1-100." When presented with a range, the first set of characters 22 that defines the number of groups evenly divides the range.

Thus, five groups 28 into the range of 1-100 establishes an interval of 20, and the groups are 1-20, 21-40, 41-60, 61-80, and 81-100.

Figure 4:
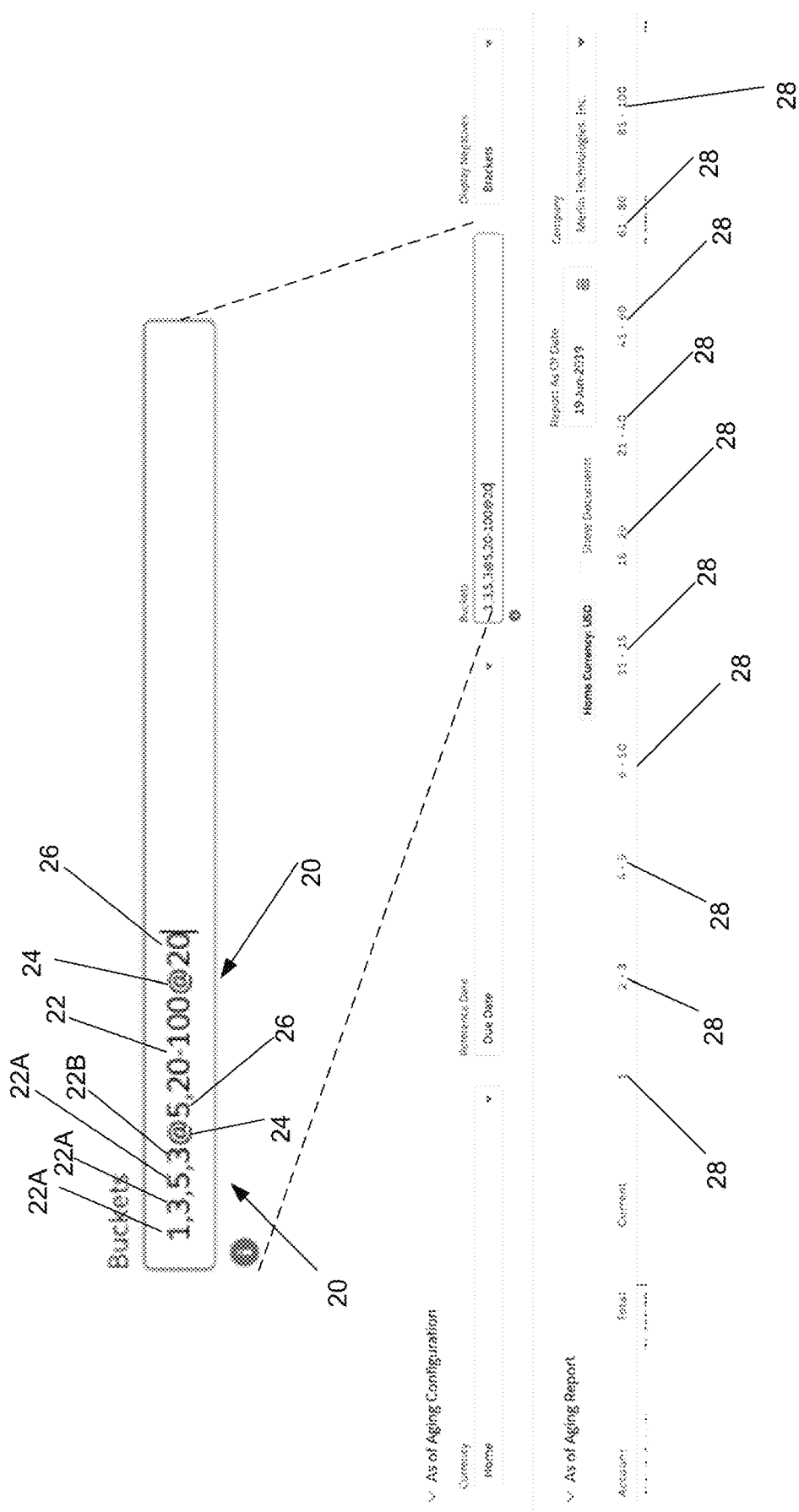
FIG. 4 is a screenshot of multiple group notations supplied as user input convertible into standardized input that defines groups.

FIG. 4 is a screenshot of multiple group notations 20 supplied as user input convertible into standardized input that defines groups 28. Here, two separate group notations 20 are entered as distinguished by the two dividing symbols 24. Each group notation 20 is separated by a comma. However, the comma symbol is not conserved to a single meaning in the system and, thus, further semantic interpretation by the system is performed to delineate the two group notations 20. Commas are global separators between instructions. Commas exist inside of group notations 20, and between group notations 20. In each group notation 20, each second set of characters 26 positioned to the right side of the dividing symbol 24 only includes a single number. Thus, after the first single number after a dividing symbol 24 (a second set character 26), the next number belongs to a next group notation 20.

Multiple group notations 20 cause the system to display all groups 28 that are called for by the multiple group notations 20. Pictured in the figure, the left group notation 20 includes groups that are respectively bounded by 1, 3, and 5 (e.g., 1, 2-3, and 4-5), and then the last number 22B of the first set of characters 22 calls for 3 more groups. The second set of characters 26 indicate that the remaining 3 additional groups 28 have a range/interval of 5. Continuing from the bounds of the last called group ("5"), the remaining 3 additional groups are 6-10, 11-15, and 16-20.

In the right group notation 20, the first set of characters 22 is a range "20-100" and the second set of characters 26 is a range interval of 20. Since 20 goes into 20-100 four times, there are 4 additional groups 28 generated (e.g., 21-40, 41-60, 61-80, and 81-100).

With the groups 28 established, the graphic user interface displays all the groups 28 in series. 1, 2-3, 4-5, 6-10, 11-15, 16-20, 21-40, 41-60, 61-80, and 81-100. The multiple group notations 20 enable a user to change the scale of the ranges after a chosen point.

Figure 5:
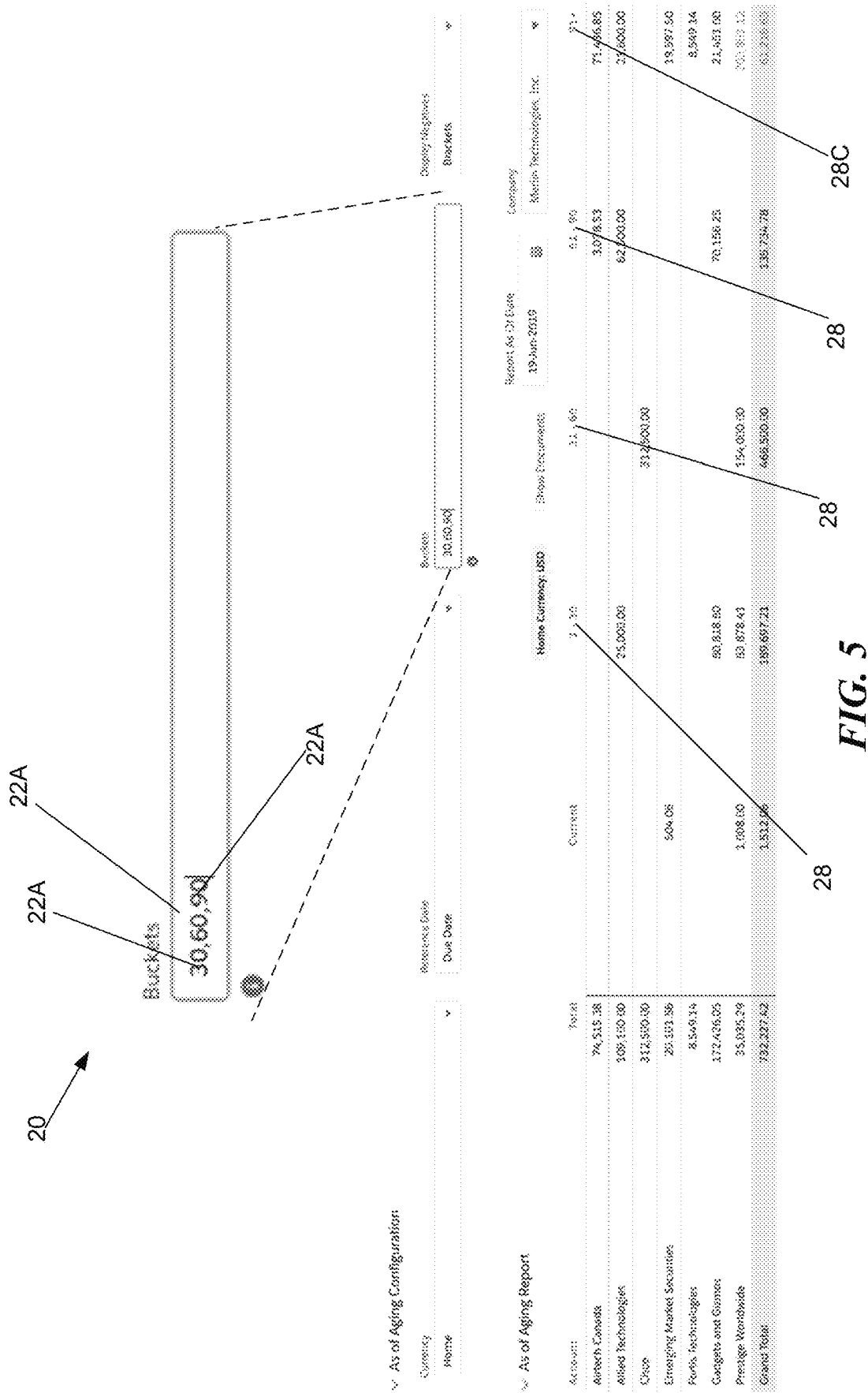
FIG. 5 is a screenshot of a group notation that references multiple ranges. Pictured in the figure, there is no dividing symbol.

FIG. 5 is a screenshot of a group notation 20 that references multiple ranges. Pictured in the figure, there is no dividing symbol. Instead, a series of numbers separated by commas is present. Where there is no dividing symbol, the second set of characters 22 is dispensed with. Rather, only the first set of characters 22 is present. The system thus parses the user input similarly to the first set of characters 22 as depicted in FIG. 2. That is, the preliminary numbers 22A each establish a top end of a single group 28. Because there is no dividing symbol, there is no "last number" as there was in FIG. 2.

Following the example of FIG. 2, in FIG. 5 there are 3 groups 28 bounded by the preliminary numbers 22A, 1-30, 31-60, and 61-90. Since there is no "last number," an additional "remainder" group 28C is generated by the system that includes any leftover data (e.g., 91+).

Figure 6:
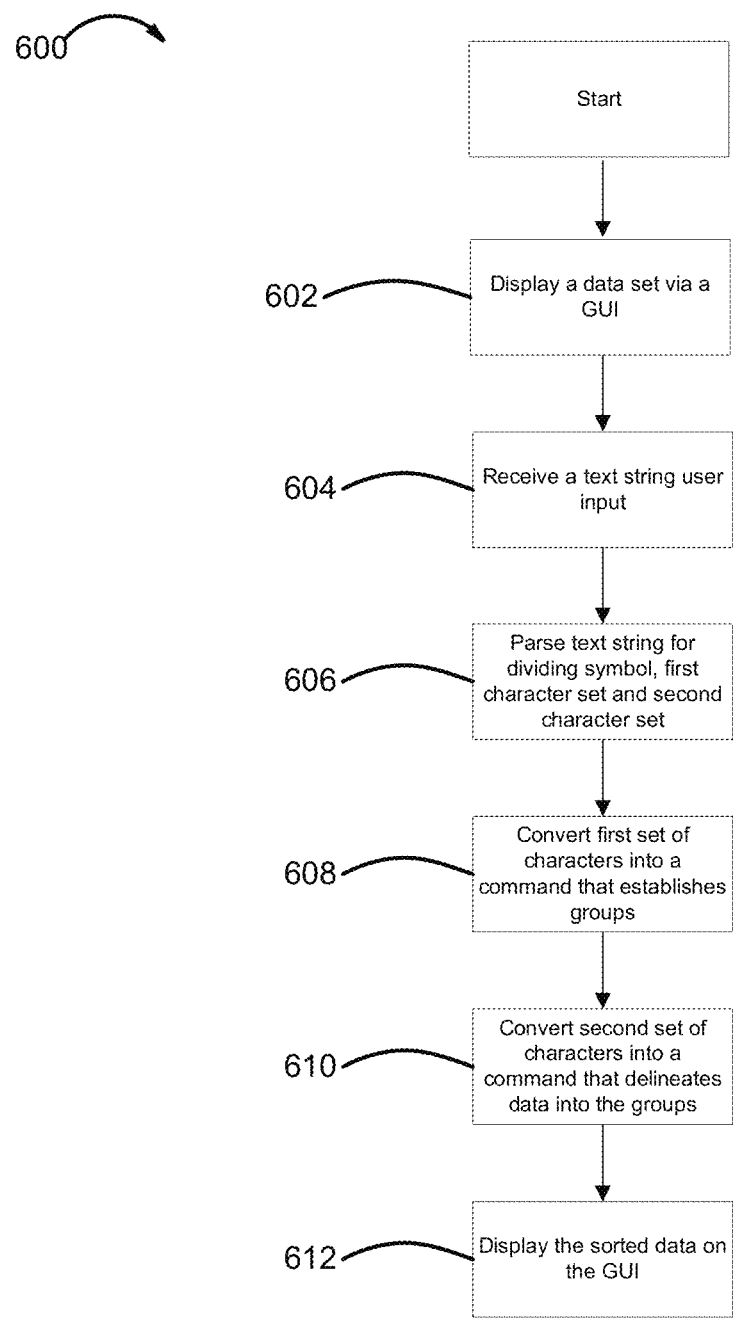
FIG. 6 is a flowchart illustrating a method of converting user input into standardized input.

FIG. 6 is a flowchart illustrating a method of converting user input into standardized input. In step 602, a GUI displays a set of unsorted data. In step 604, the GUI receives a user input in a given field. The user input is a text string. In step 606, the system parses the user input text string for a number of components. Components include a dividing symbol, a first set of characters and a second set of characters. In some embodiments, not all parts are present. Dividing symbols are identified by use of reserved characters. The first and second sets of characters are positioned on either side of the dividing symbol. Where no dividing symbol exists, only a first set of characters is present.

In some embodiments, the system starts with an instruction counter set to zero (or less than or equal to zero). Each instruction set added in step 606 adds a column to the display. An instruction of "20" is a single instruction set that adds the value 20. An instruction of 1-100/5 includes 5 instructions that adds values 20,40,50,80,100. In some embodiments, the system ignores instructions that do not advance the data set. That is, where instructions are "20, 50, 30" the "30" is ignored because that instruction would generate a range of the data set that is already covered between 21 and 50. Additionally, the system also ignores instructions that would result in infinitely long lists (1-100@0).

In step 608, the system converts the first set of characters into a standardized command that establishes a set of the plurality of items of the data set to sort into a number of groups based on a numerically sortable attribute within the data set. Examples of a numerically sortable attribute are amounts, dates, or any sort of data that may be represented by numbers. Various embodiments of the first set of characters define a scope of the data to be sorted and how many groups (or buckets) that data should be sorted into.

In step 610, the system converts the second set of characters into a standardized command that establishes how to delineate the set of the plurality of items of the data set into the groups that the first set of characters established, based on the numerically sortable attribute. Various embodiments of the second set of characters define a scale of ranges of data to be sorted into each group (or bucket). Thus, the second set of characters influences the size of each group in bounding ranges (as opposed to the number of items within each group). The number of items within each group is determined merely by the data that matches the bounds influenced by the second set of characters.

Once the scope and scale of the groups are established, in step 612, the system updates the graphic user interface to display the data sorted into the specified groups.

Figure 7:
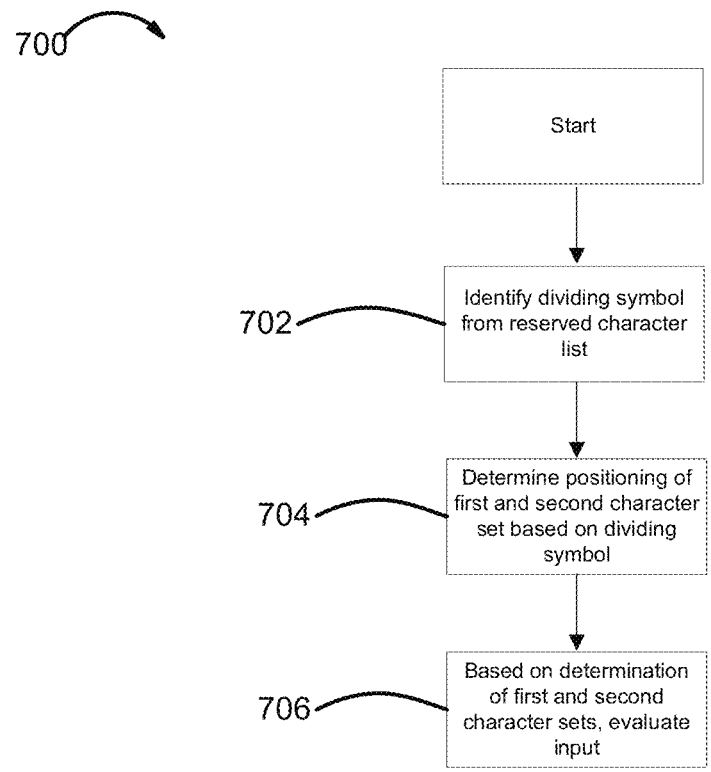
FIG. 7 is a flowchart illustrating interpretation of dividing symbols.

FIG. 7 is a flowchart illustrating interpretation of dividing symbols. In step 702, the system first identifies a symbol from a list of reserved characters within a text string. Examples of the reserved characters are "@", "/", "\". In step 704, the system evaluates the specific dividing symbol used. In step 706, based on the dividing symbol used, the orientation of the first and second sets of characters relative to the dividing symbol are determined. For a given dividing symbol, the first set of characters appears on the left, and the second set of characters is on the right of the dividing symbol. For another given dividing symbol, the positioning of the first and second sets of characters is reversed.

Figure 8:
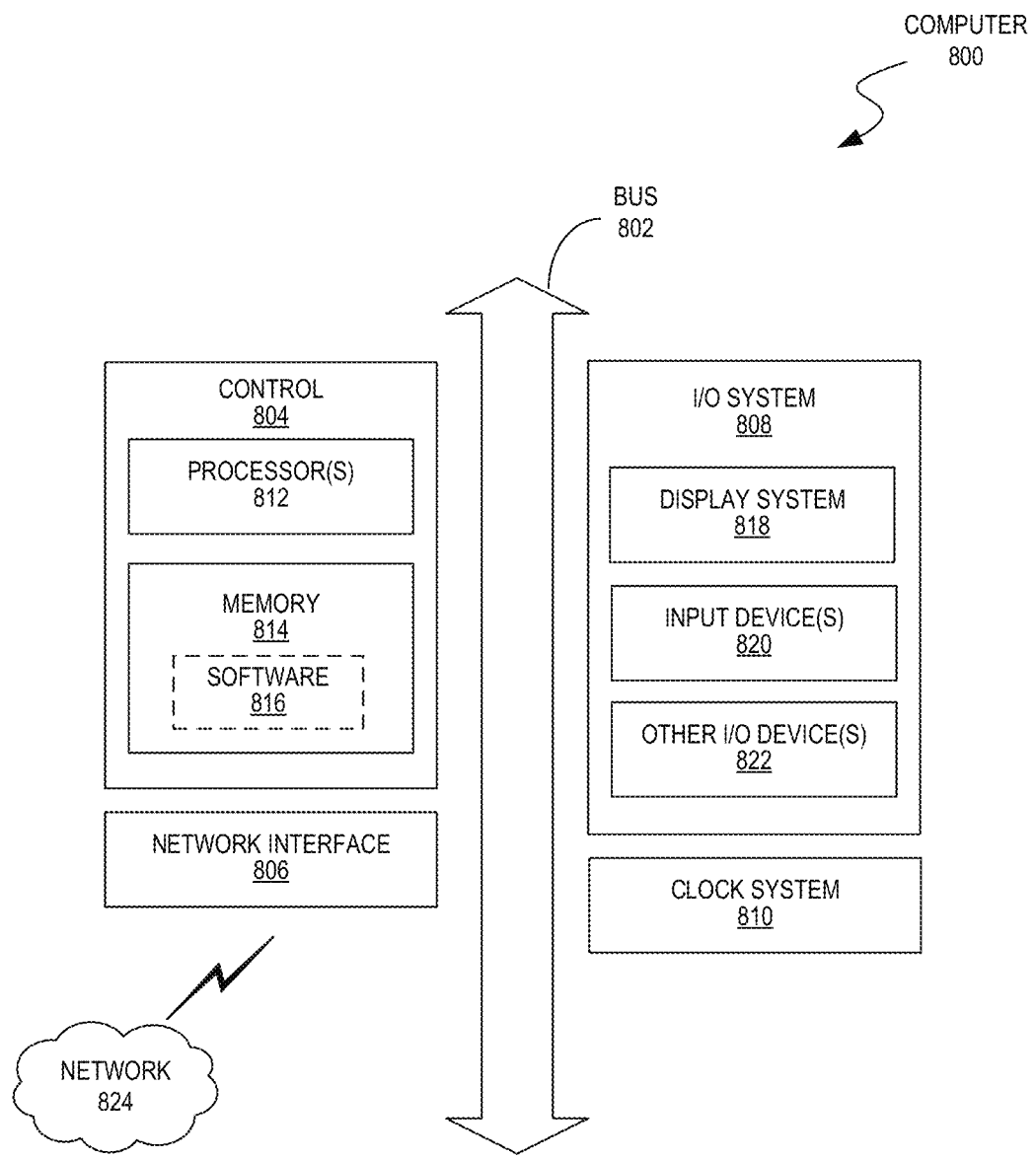
FIG. 8 is a block diagram of a computer operable to implement the disclosed technology according to some embodiments of the present disclosure.

FIG. 8 is a block diagram of a computer 800 operable to implement the disclosed technology according to some embodiments of the present disclosure. The computer 800 may be a generic computer or specifically designed to carry out features of the disclosed user input conversion system. For example, the computer 800 may be a system-on-chip (SOC), a single-board computer (SBC) system, a desktop or laptop computer, a kiosk, a mainframe, a mesh of computer systems, a handheld mobile device, or combinations thereof.

The computer 800 may be a standalone device or part of a distributed system that spans multiple networks, locations, machines, or combinations thereof. In some embodiments, the computer 800 operates as a server computer or a client device in a client-server network environment, or as a peer machine in a peer-to-peer system. In some embodiments, the computer 800 may perform one or more steps of the disclosed embodiments in real time, near real time, offline, by batch processing, or combinations thereof.

As shown in FIG. 8, the computer 800 includes a bus 802 that is operable to transfer data between hardware components. These components include a control 804 (e.g., processing system), a network interface 806, an input/output (I/O) system 808, and a clock system 810. The computer 800 may include other components that are not shown nor further discussed for the sake of brevity. One who has ordinary skill in the art will understand elements of hardware and software that are included but not shown in FIG. 8.

The control 804 includes one or more processors 812 (e.g., central processing units (CPUs)), application-specific integrated circuits (ASICs), and/or field-programmable gate arrays (FPGAs), and memory 814 (which may include software 816). For example, the memory 814 may include volatile memory, such as random-access memory (RAM), and/or non-volatile memory, such as read-only memory (ROM). The memory 814 can be local, remote, or distributed.

A software program (e.g., software 816), when referred to as "implemented in a computer-readable storage medium," includes computer-readable instructions stored in the memory (e.g., memory 814). A processor (e.g., processor 812) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 800), which, when read and executed by at least one processor (e.g., processor 812), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 814).

The network interface 806 may include a modem or other interfaces (not shown) for coupling the computer 800 to other computers over the network 824. The I/O system 808 may operate to control various I/O devices, including peripheral devices, such as a display system 818 (e.g., a monitor or touch-sensitive display) and one or more input devices 820 (e.g., a keyboard and/or pointing device). Other I/O devices 822 may include, for example, a disk drive, printer, scanner, or the like. Lastly, the clock system 810 controls a timer for use by the disclosed embodiments.

Operation of a memory device (e.g., memory 814), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:
1. A method interpreting an input string, comprising:
displaying, on a graphic user interface, a data set, the data set including a plurality of items that each include a numerically sortable attribute;

receiving via a user input a string including a first set of characters and a second set of characters positioned on either side of a dividing symbol;

converting the first set of characters into a first standardized input that establishes a set of the plurality of items of the data set to sort into a number of groups based on the numerically sortable attribute of the data set;

converting the second set of characters into a second standardized input that establishes how to delineate the set of the plurality of items of the data set into the number of groups based on the numerically sortable attribute of the data set; and displaying, on the graphic user interface, the number of groups, each group populated by a subset of the set of the plurality of items of the data set as delineated by the second standardized input.

2. The method of claim 1, wherein the first set of characters is positioned to the left of the dividing symbol, and the second set of characters is positioned to the right of the dividing symbol.

3. The method of claim 1, wherein the first set of characters is a single number and said converting the first set of characters comprises:

establishing all of the data set as the set of the plurality of items of the data set; and establishing the single number as the number of groups.

4. The method of claim 3, wherein the second set of characters is a second single number and said converting the second set of characters comprises:

establishing ranges of the set of the plurality of items of the data set, the ranges defined by the second single number as compared to the numerically sortable attribute, wherein the ranges are inclusive of last number in the range; and delineating the subset of the set of the plurality of items of the data set based on the ranges to each of the number of groups.

5. The method of claim 1, wherein the first set of characters includes at least one preliminary number and a last number where each number is separated by a comma and said converting the first set of characters comprises:

establishing groups of the number of groups that each end on a respective preliminary number as compared to the numerically sortable attribute; and establishing the last number as a number of groups in addition to those defined by the at least one preliminary number.

6. The method of claim 5, wherein the second set of characters is a single number and said converting the second set of characters comprises:

establishing ranges of the set of the plurality of items of the data set, the ranges defined by the single number as compared to the numerically sortable attribute, wherein the ranges are inclusive of last number in the range; and delineating the subset of the set of the plurality of items of the data set based on the ranges to each of the number of groups.

7. The method of claim 1, wherein the first set of characters is a range of numbers defined by a first number and a second number separated by a dash and said converting the first set of characters comprises:

establishing all of the data set bounded by and including the first number and the second number as compared to the numerically sortable attribute as the set of the plurality of items of the data set.

8. The method of claim 7, wherein the second set of characters is a single number and said converting the second set of characters comprises:

establishing additional ranges of the set of the plurality of items of the data set, the additional ranges defined by the single number as compared to the numerically sortable attribute, wherein the additional ranges are inclusive of last number in the range; and delineating the subset of the set of the plurality of items of the data set based on the additional ranges to each of the number of groups.

9. The method of claim 1, wherein the dividing symbol is any of:

"@";
"/"; or
"\".

10. A method interpreting an input string, comprising:

displaying, on a graphic user interface, a data set, the data set including a plurality of items that each include a numerically sortable attribute;

receiving via a user input a string including a number of grouping notations, each grouping notation including a first set of characters and a second set of characters positioned on either side of a dividing character;

isolating each grouping notation from the input string based on identification of a punctuation character occurring after an instance of the dividing character; and for each isolated grouping notation:

converting the first set of characters into a first standardized input that establishes a set of the plurality of items of the data set to sort into a number of groups based on the numerically sortable attribute of the data set;

converting the second set of characters into a second standardized input that establishes how to delineate the set of the plurality of items of the data set into the number of groups based on the numerically sortable attribute of the data set; and displaying, on the graphic user interface, the number of groups, each group populated by a subset of the set of the plurality of items of the data set as delineated by the second standardized input.

11. The method of claim 10, wherein the first set of characters is positioned to the left of the dividing symbol, and the second set of characters is positioned to the right of the dividing symbol.

12. The method of claim 10, wherein the first set of characters is a first number and a second number separated by a comma and said converting the first set of characters comprises:

establishing all of the data set greater than or equal to the first number as compared to the numerically sortable attribute as the set of the plurality of items of the data set; and establishing the second number as the number of groups.

13. A system interpreting an input string, comprising:

a graphic user interface configured to display a data set, the data set including a plurality of items that each include a numerically sortable attribute;

a computing device including a processor configured to receive a user input a string including a first set of characters and a second set of characters positioned on either side of a dividing symbol, the computing device further configured to convert the first set of characters into a first standardized input that establishes a set of the plurality of items of the data set to sort into a number of groups based on the numerically sortable attribute of the data set and convert the second set of characters into a second standardized input that establishes how to delineate the set of the plurality of items of the data set into the number of groups based on the numerically sortable attribute of the data set; and wherein the computing device is further configured to instruct the graphic user interface to update display of the data set to include the number of groups, each group populated by a subset of the set of the plurality of items of the data set as delineated by the second standardized input.

14. The system of claim 13, wherein the first set of characters is positioned to the left of the dividing symbol, and the second set of characters is positioned to the right of the dividing symbol.

15. The system of claim 13, wherein the first set of characters is a first number and a second number separated by a comma and the computing device is further configured to convert the first set of characters by establishing all of the data set greater than or equal to the first number as compared to the numerically sortable attribute as the set of the plurality of items of the data set and establishing the second number as the number of groups.

16. The system of claim 13, wherein the first set of characters is a single number and the computing device is further configured to convert the first set of characters by establishing all of the data set as the set of the plurality of items of the data set and establishing the single number as the number of groups.

17. The system of claim 13, wherein the dividing symbol is any of:

"@";
"/"; or
"\".

* * * * *